United States Patent Office 2,970,699
Patented Feb. 7, 1961

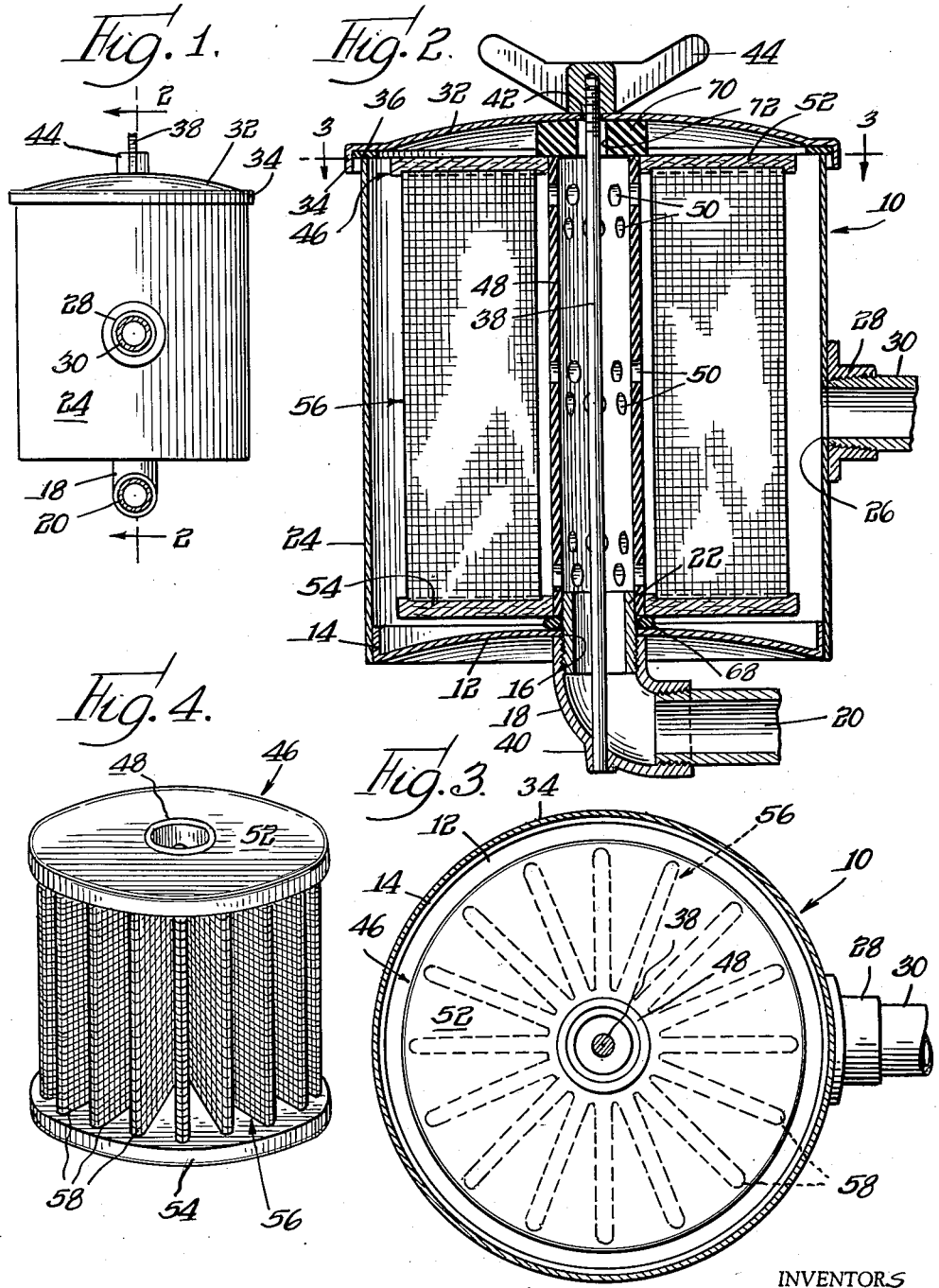

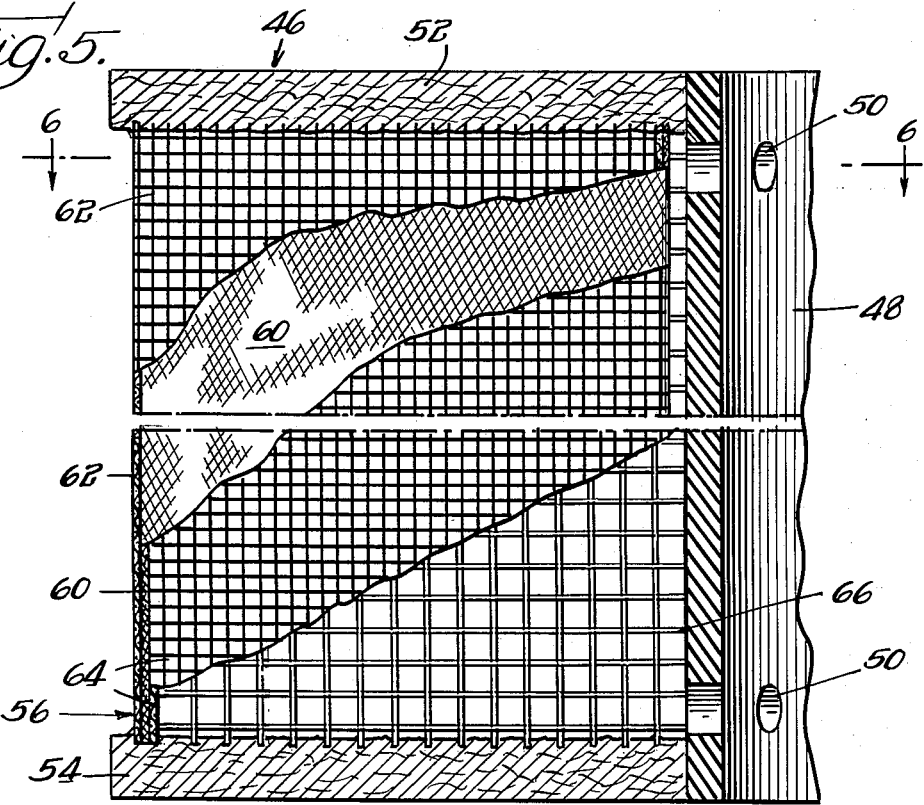
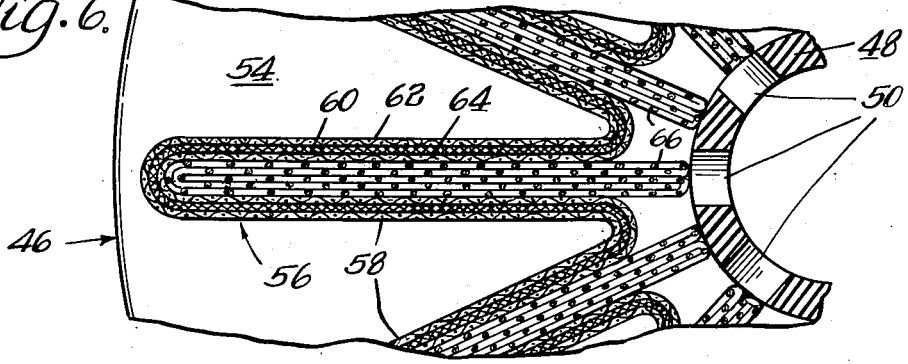
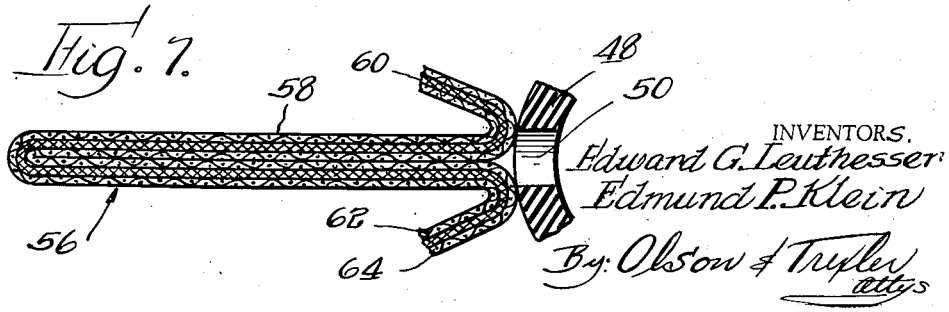

2,970,699
FILTER

Edward G. Leuthesser, Glen Ellyn, Ill., and Edmund P. Klein, 4115 N. Monitor, Chicago 34, Ill.; said Leuthesser assignor to said Klein Filed Dec. 24, 1956, Ser. No. 630,109

1 Claim. (Cl. 210—457)

This invention relates to filter units adapted to handle relatively large volumes of water or other liquids, as for use in conjunction with a swimming pool. The filter units of this invention are also suitable for handling cleaning fluids, plating solutions, beverages and other fluids.

An important object of this invention is to provide a filter unit of the type indicated capable of withstanding a high inlet liquid pressure even though the outlet pressure may be low and may even fall below atmospheric pressure.

Other and further objects and features of this invention will become apparent from the following description and appended claim as illustrated by the accompanying drawings which show, by way of an example, a filter according to the present invention and in which:

Fig. 1 is an elevational view of a filter according to the present invention;

Fig. 2 is an enlarged cross sectional view, with parts shown in elevation, taken along the line 2—2 of Fig. 1;

Fig. 3 is a cross sectional view taken along the line 3—3 of Fig. 2;

Fig. 4 is a perspective view of the filter member of the unit of Figs. 1 to 3;

Fig. 5 is an enlarged fragmentary central vertical cross sectional view, with parts broken away and other parts shown in elevation, of the filter member of Fig. 4;

Fig. 6 is a fragmentary cross sectional view taken along the line 6—6 of Fig. 5; and Fig. 7 is a fragmentary view similar to Fig. 6 showing a modified construction of the filter member.

A filter unit according to this invention is generally indicated in Figs. 1 to 3 by the reference numeral 10. The unit includes an upwardly arcuate base plate 12 having an upstanding peripheral flange 14 and apertured centrally, as indicated at 16. An internally threaded elbow 18 is attached (by welding or any other suitable means) to the bottom of the base 12 in registration with the base aperture 16. A discharge conduit 20 is inserted into the free end of the elbow 18. A short nipple 22 is threaded into the other end of the elbow 18, to project above the base 12.

The filter unit 10 further includes a tubular sidewall 24 having its lower margin attached (by welding or any other suitable method) to the outside of the base plate flange 14. The sidewall 24 is apertured at 26, and a flanged internally threaded nipple 28 is attached to the sidewall in registration with the aperture 26. An inlet conduit 30 is threaded into the free end of the nipple 28.

The filter unit 10 additionally includes a cover plate 32 of upwardly arcuate form except for its peripheral margin overlying the upper edge of the sidewall 24. This margin is flat. The cover plate 32 extends radially a short distance beyond the sidewall 24, and is provided with a depending peripheral flange 34. An annular gasket 36 is interposed between the upper edge of the sidewall 24 and the flat peripheral margin of the cover 32.

The base plate 12, sidewall 24 and cover plate 32 together form a housing for the unit 10. This housing is removably held in assembled relationship by a drawbar 38 extending centrally and vertically through this housing. Specifically, the drawbar 38 has its lower end portion projecting through the elbow 18 and welded to the outside of this elbow, as indicated at 40. The upper end of the drawbar 38 is threaded, and projects through a central aperture 42 in the cover plate 32 above the latter, to receive a wing nut 44.

A filter member generally indicated in Figs. 2 to 6 by the reference numeral 46 is disposed within the housing 12, 24, 32. The filter member 46 includes a central axial pipe 48 formed with a plurality of apertures 50 for admitting filtered fluid into the pipe. A pair of round end plates, discs 52 and 54 centrally apertured to receive the pipe 48 are attached, respectively, to the upper and lower ends of the pipe 48, with their upper and lower surfaces, respectively, flush with the upper and lower ends of the pipe 48. A filter element generally indicated at 56 extends between the end plates 52 and 54 with its ends tightly attached thereto. The filter element 56 is generally tubular, but its wall is formed into radial folds or pleats 58 to expose a large filtering surface. The inner ends of the pleats or folds 58 are spaced from the pipe 48. The detailed construction of the filtering element 56 is shown in Figs. 5 and 6 as including a filtering medium 60 (such as nylon or Dacron cloth) covered on its outside by a wire cloth 62 and on its inside by another wire cloth 64. The interior of each pleat or fold 58 is filled with a rigid easily liquid-permeable body 66 such as a piece of heavy wire cloth of one or more thicknesses. The insert 66 may extend radially inwardly into abutment with the pipe 48. Ordinarily, the insert 66 is held in place by engagement with the inner layer of wire cloth.

A modification of the filtering element 56 is illustrated in Fig. 7. As shown, the insert 66 is omitted. Clearance between the opposed inner sides of the filter medium 60 is provided by the wire cloth 64, which, in effect, is folded back upon itself and performs the function of the insert 66 (described hereinbelow).

For convenient construction, the pipe 48 may be made of any suitable rigid material. The end plates 52 and 54 may be made of a suitable synthetic resin reinforced, if desired, by material such as fiber glass. Then the filter element 56 may have its upper and lower margins embedded in the end plates 52 and 54, to insure a tight connection therebetween. In such a construction, the end plates 52 and 54 may be sealed to the pipe 48, so that the pipe 48, the end plates 52 and 54, and the filter element 56 together form an integral unit which is rigidified by the pipe 48, the end plates 52 and 54 and the inserts 66.

The filter member 46 is disposed within the housing 12, 24, 32 as follows. The cover plate 32 being disassembled from the sidewall 24, an O-ring 68 is disposed in the corner defined between the top surface of the bottom plate 12 and the outside of the upper portion of the nipple 22. The filter member 46 is then inserted into the cylindrical space defined by the sidewall 24. The outside of the nipple 22 fits tightly within the lower end of the pipe 48. The drawbar 38 extends upwardly through the pipe 48. The gasket 36 is next placed on the upper edge of the sidewall 24. A thick rubber disk 70 is disposed over the upper opening of the pipe 48. The disk 70 has a diameter wider than the pipe 48, so that it rests on the margin of the upper end plate 52 around the central aperture of the latter. The disk 70 is centrally apertured, as indicated at 72, to admit the drawbar 38 therethrough. The cover plate 32 may then be placed on top of the gasket 36 and the disk 70 and the wing nut 44 may be tightened. Disassemblage is effected in reverse order.

The functioning the filter unit 10 is described as follows. Water or other liquid entering through the inlet pipe 30 fills the space defined within the housing 12, 24, 32. Thence the water or other liquid flows through the filter element 56 and enters the pipe 48 through the apertures 50 therein. The pipe 48 discharges the filtered water or other liquid into the outlet pipe 20.

When used in conjunction with a swimming pool, the water to be filtered is pumped from the pool and enters the inlet pipe 30 under considerable pressure. In fact, the pressure is often or usually sufficient to collapse the folds or pleats 58 of the filter element 56 if the rigid permeable fold inserts 66 (or the wire cloth 64) are omitted, particularly if any sediment or debris has accumulated on the outside of the filter element so that the flow of water through the filter element is somewhat impeded. Such collapse of the pleats or folds 58 would render the filter inoperative. Thus, the rigid or crush-proof permeable insert 66 (or the wire cloth 64) makes filtration possible even when there is a very considerable pressure gradient across the filter cloth 56. It should be noted, in this connection, that the pressure in the discharge pipe 20 may sometimes fall below atmospheric pressure, and that the incoming water may be under pressure of 40 or 50 pounds per square inch or higher.

Due to the rigidity of the folds or pleats 58 brought about by the inserts 66 (or the wire cloth 64), the pressures exerted in opposite direction on the opposed outer surfaces of the pleats or folds are balanced and distortion or twisting of the filter element is avoided.

The light wire cloths 62 and 64 protect the wire cloth 60 against mechanical damage, as by small objects entering through the inlet 30, or when the filter element is being cleaned.

Many details of construction may be varied without departing from the principles of this invention and it is therefore not our intention to limit the patent granted on this invention otherwise than necessitated by the scope of the appended claim.

The invention is claimed as follows:

A filter for use in systems characterized by large flow rates and appreciable pressures comprising: a central pipe having apertured walls; a pair of centrally apertured discs secured one about each end of said pipe; a first rigid, coarse mesh support element disposed about said pipe extending between said discs to be formed into a series of radial folds; a second rigid, coarse mesh support element disposed about said pipe extending between said discs inwardly of said first support element to be spaced a uniform distance apart from said first support element; a plurality of third coarse mesh, rigid support elements, each disposed inwardly in one of the folds of said second support element; and a fabric filter element sandwiched between said first and said second support elements.

References Cited in the file of this patent

UNITED STATES PATENTS

| | | |
|---|---|---|
| 2,395,449 | Briggs | Feb. 26, 1946 |
| 2,457,958 | Walker | Jan. 4, 1949 |
| 2,627,350 | Wicks | Feb. 3, 1953 |
| 2,642,188 | Layte et al. | June 16, 1953 |
| 2,730,241 | Thomas | Jan. 10, 1956 |

FOREIGN PATENTS

| | | |
|---|---|---|
| 614,684 | Great Britain | Dec. 20, 1948 |
| 1,045,264 | France | June 24, 1953 |